United States Patent Office 3,780,025
Patented Dec. 18, 1973

3,780,025
SILICON COMPOUNDS CONTAINING
LACTAM STRUCTURES
John Thompson, Barry, Wales, assignor to Midland
Silicones Limited, Reading, Berkshire, England
No Drawing. Filed Apr. 30, 1971, Ser. No. 139,187
Claims priority, application Great Britain, May 4, 1970,
21,377/70
Int. Cl. C07d 41/06; C08g 47/02, 47/10
U.S. Cl. 260—239.3 R  11 Claims

ABSTRACT OF THE DISCLOSURE

Organosilicon compounds containing lactam structures defined by the general formula

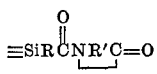

where R is alkylene or alkenylene of 3 to 18 carbon atoms and R' is alkylene of 2 to 15 carbon atoms are useful as sizing agents for glass fibers and fabrics and as intermediates for preparing modified nylon type materials exhibiting improved physical properties. The lactam structure is introduced into the organosilicon compound by reaction of an organosilicon compound containing ≡SiH with a lactam substituted at the nitrogen atom by an alkenoyl or alkynoyl group.

---

This invention relates to novel organosilicon compounds and to a process for the preparation thereof.

The organosilicon compounds of this invention are silanes and siloxanes having in the molecule at least one lactam structure.

The silanes of this invention are those having the general formula

wherein each R'' represents a halogen atom, an alkoxy radical, an alkoxyalkoxy radical, an aryloxy radical, an acyloxy radical or a monovalent hydrocarbon or monovalent halohydrocarbon radical free of aliphatic unsaturation, R represents an alkylene or alkenylene radical having from 3 to 18 carbon atoms and R' represents an alkylene radical having from 2 to 15 carbon atoms.

In the general formula, each R'' represents a halogen atom, preferably chlorine or bromine, an alkoxy or aryloxy radical, e.g. methoxy, ethoxy, propoxy, butoxy and phenoxy, an alkoxyalkoxy radical, e.g. methoxyethoxy, ethoxyethoxy and methoxypropoxy or an acyloxy radical, e.g. acetoxy and propionoxy. Each R'' can also be a monovalent hydrocarbon radical or monovalent halohydrocarbon radical free of aliphatic unsaturation and preferably containing less than 19 carbon atoms. Examples of such radicals are methyl, ethyl, propyl, n-octyl, tetradecyl, octadecyl, phenyl, naphthyl, benzyl, tolyl, chloromethyl, bromophenyl and trifluoropropyl and other such radicals well known in the organosilicon art. In any given molecule, the R'' radicals can be the same or different, for example, the silicon atom can have bonded thereto three alkoxy radicals or two alkoxy radicals and a monovalent hydrocarbon radical, e.g. a methyl radical. From the commercial aspect, the preferred compounds are those in which the R'' substituents are chlorine atoms or alkoxy radicals having less than 5 carbon atoms.

The radical R can be any alkylene or alkenylene radical having from 3 to 18 carbon atoms, for example, the propylene, butylene, butenylene, octenylene, 2,5-octylene and decylene radicals. Preferably, R has from 3 to 11 carbon atoms. R' can be any linear or branched alkylene radical having from 2 to 15 carbon atoms, e.g. —(CH₂)₃—, —(CH₂)₅— and —(CH₂)₁₀—.

The siloxanes of this invention have in the molecule at least one unit of the general formula

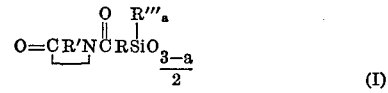

wherein R and R' have the meanings as hereinabove defined, R''' represents a monovalent hydrocarbon radical or monovalent halogenated hydrocarbon radical, as exemplified for Z below, and $a$ is 0, 1 or 2. The siloxanes can be homopolymers containing only units of the above type or they can be copolymers of the defined units with units of the general formula

wherein Z represents a hydrogen atom, a monovalent hydrocarbon radical or a monovalent halohydrocarbon radical of 1 to 18 carbon atoms and $b$ is 0, 1, 2, or 3. Z can be any monovalent hydrocarbon radical as this term is generally defined in the organosilicon art, e.g. methyl, ethyl, propyl, butyl, decyl, octadecyl, cyclohexyl, vinyl, alkyl, phenyl, tolyl and benzyl and can be any monovalent halohydrocarbon radical as this term is generally defined in the organosilicon art, e.g. chloromethyl, bromohexyl, chlorophenyl and 3,3,3-trifluoropropyl. Preferably, the R''' and Z radicals are selected from methyl and phenyl radicals.

The siloxanes of the invention can vary in molecular size from the disiloxanes to high molecular weight homopolymers and copolymers. Included within the scope of this invention, therefore, are disiloxanes of the formula

in which R, R' and R''' are as defined above. Also included are the disiloxanes consisting of one unit of Formula I and one unit of Formula II in which $a$ is 2 and $b$ is 3. The preferred siloxanes are the copolymers comprising units of Formulae I and II in which $a$ is 1 or 2 and $b$ is 2.

The silanes and siloxanes of this invention can be prepared by reacting a silane or siloxane containing silicon-bonded hydrogen with a lactam substituted at the nitrogen by an alkenoyl or an alkynoyl group. This invention, therefore, includes a process for the preparation of the silanes and siloxanes of the invention which comprises reacting (1) (a) a silane of the formula R''₃SiH or (b) a siloxane containing at least one unit of the general formula

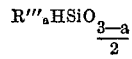

wherein R'', R''' and $a$ are as defined hereinabove with (2) a lactam of the general formula

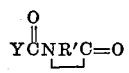

wherein R' is as hereinabove defined and Y represents an aliphatic radical having from 3 to 18 carbon atoms and having olefinic or acetylenic unsaturation. The Y radicals include hydrocarbon radicals and radicals composed of carbon, hydrogen and oxygen in which the oxygen is present in the form of ether linkages (C—O—C). Examples of Y radicals include $$CH_2=CHCH_2-, \quad CH_2=CH(CH_2)_8-,$$
$$CH_2=CHCH_2OCH_2(CH)-, \quad CH_2=CHC_6H_4-$$
and
$$CH\equiv CHCH_2CH_2-.$$

Preferably, Y is an alkenyl radical having from 3 to 11 carbon atoms.

The silane and siloxane reactants (1)(a) and (1)(b) are well-known materials and methods for their preparation will be readily apparent to those skilled in the art. Examples of silanes (1)(a) are trimethylsilane, trichlorosilane, dimethylchlorosilane, phenylmethylethoxysilane, tri-isopropoxysilane and phenyldiethoxysilane. Examples of the siloxane reactant (1)(b) are methylhydrogen polysiloxanes, copolymers of methylhydrogen siloxane units and one or more of dimethylsiloxane units, phenylmethylsiloxane and trimethylsiloxane units and copolymers of diorganosiloxane units, e.g. dimethylsiloxane units and dimethylhydrogen siloxane units.

As reactant (2), there can be employed for example N-(vinyl acetyl)caprolactam, N-(methacryloyl)caprolactam, N-(10-undecenoyl)caprolactam, N-(vinylacetyl)pyrrolidone and N-(10-undecenoyl)lauryl lactam. Such unsaturated lactams are a known and art recognized class of compounds and can be prepared by the reaction of the appropriate unsaturated acyl chloride, e.g. vinyl acetyl chloride, with a lactam, e.g. epsilon-caprolactam.

The process of this invention involves the addition of the silicon-bonded hydrogen of reactant (1) to the N-(alkenoyl) or N-(alkynoyl) lactam. Such a reaction is best carried forward in the presence of a catalyst, for example, chloroplatinic acid, platinum on carbon, complexes of platinum compounds with unsaturated compounds, dicobalt octacarbonyl or free radical catalysts such as azobisisobutyronitrile. The above list of suitable catalysts is not exhaustive and any of the materials known to catalyze the addition reaction of SiH groups to an aliphatically-unsaturated group can be used. Chloroplatinic acid is, however, the preferred catalyst.

Elevated temperatures accelerate the addition reaction but the proportions of reactants, the particular temperature and the pressure employed are not critical. Preferably, the reaction is carried out at a temperature in the range from 70° to 140° C.

Another method of preparing the siloxanes of this invention comprises effecting hydrolysis of the silanes of the invention and condensation of the hydrolysis product. A further method of preparing the siloxanes comprises effecting the anionic polymerization of a cyclic siloxane, e.g. hexamethylcyclotrisiloxane, a methylvinylcyclotrisiloxane or a methylphenylcyclotrisiloxane by reaction with e.g. butyl lithium, vinyl lithium or sodium naphthalene by known techniques. The polymerized cyclic siloxane is then reacted with a silane or siloxane having at least one of the specified lactam substituents and a silicon-bonded halogen atom. Such methods are, however, generally less preferred than that involving the addition of the N-(alkenoyl) or N-(alkynoyl) lactams to the preformed SiH containing siloxane polymer.

The silanes and siloxanes of this invention are characterized by the presence therein of lactam structures linked to the silicon atoms through a carbon atom bridge having a carbonyl group adjacent to the nitrogen atom of the lactam. The presence of this particular structure in the compounds of this invention enables the compounds to be copolymerized with lactams to provide polyamides containing silyl or siloxanyl moieties. Thus, the siloxanes can be copolymerized with lactams to provide siloxane-polyamide block copolymers which can be incorporated into polyamides to endow the polyamides with release, water-repellent or lubricated surfaces. Silanes of this invention wherein one or more of the R″ radicals are alkoxy or alkoxyalkoxy radicals are useful as sizes for glass fibers and other inorganic filler materials for improving the bonding of such materials to polyamides.

The compounds of this invention can also be reacted with aliphatic and aromatic, monomeric and polymeric amines and amides, the latter requiring a catalyst. Thus, the siloxanes can be used as reactive surface treatments or as crosslinking agents for such polymers. The silanes, in which one or more of the R″ radicals are alkoxy, can be used to provide moisture-curing crosslinking sites in polymers containing amino groups.

The following examples illustrate the invention.

EXAMPLE 1

N-(vinylacetyl)caprolactam (3.62 g., 0.02 mole) was slowly added to 37 g. (0.01 mole) of a stirred polysiloxane of the formula

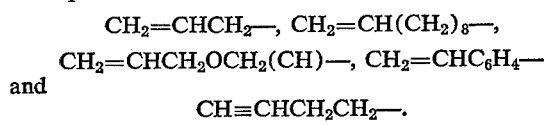

wherein $x$ has a value of approximately 50, and hexachloroplatinic acid (25 μl. of a 10% w./v. solution in isopropanol) under argon at 120° C. The stirred reaction mixture was maintained at this temperature for 8 hours until the addition was complete, as shown by the absence of the ≡SiH bond in the infrared spectrum of a sample of the reaction mixture. The excess N-vinyl acetyl caprolactam was removed by heating to 100° C. under high vacuum and the residue filtered, dissolved in benzene and reprecipitated by methyl alcohol.

The product was an adduct of N-vinyl acetyl caprolactam and the diorganopolysiloxane and was characterized by the formula

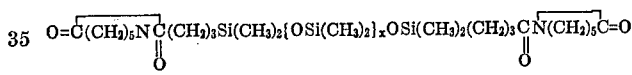

EXAMPLE 2

N-(undecenoyl)caprolactam (139.5 g., 0.5 mole) and trimethoxysilane (61 g., 0.5 mole) were mixed and stirred under argon at 80° C. Chloroplatinic acid (50 μl. of a 10% w./v. solution in isopropanol) was added followed by a further 50 μl., 6 hours later. The reaction temperature was maintained between 80° to 100° C. for 24 hours after which the product

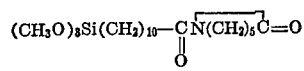

was isolated, after distillation to remove volatiles, in 85% yield.

EXAMPLE 3

N-(methacryloyl)caprolactam (18.1 g., 0.1 mole) and pentamethyldisiloxane (14.8 g., 0.1 mole) were stirred and gently refluxed under argon. Chloroplatinic acid (20 μl. of a 10% solution in isopropanol) was added and the reaction was allowed to continue at reflux temperature for 6 hours. The product was then distilled off under reduced pressure (97° to 100° C./0.05 torr) and shown to be

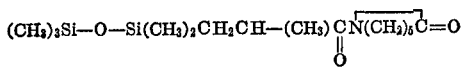

EXAMPLE 4

N-(10-undecenoyl)caprolactam (59.4 g., 0.2 mole) was added to tetramethyldisiloxane (13.4 g., 0.1 mole) using a similar method to Example 3. The product

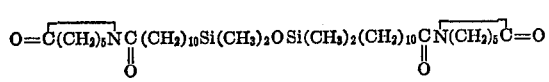

was isolated after distilling off the lower boiling point material.

EXAMPLE 5

The disiloxane prepared in Example 4 (13.8 g., 0.02 mole), octamethylcyclotetrasiloxane (88.8 g., 0.3 mole) and concentrated sulphuric acid (2 ml.) were stirred in toluene (250 ml.) at room temperature for 24 hours. The polymeric product was isolated by washing with water and precipitation with methyl alcohol. The resulting product had the average formula

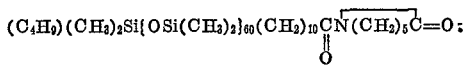

EXAMPLE 6

N - (10 - undecenoyl)caprolactam (27.9 g., 0.1 mole) was reacted with dimethylchlorosilane (9.5 g., 0.1 mole) in toluene (10 ml.) using a similar method to Example 2. The product

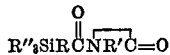

was isolated after removal of the lower boiling point material.

EXAMPLE 7

Hexamethylcyclotrisiloxane (40 g., 0.18 mole) was dissolved in freshly distilled tetrahydrofuran (100 ml.) and the solution was dried over a molecular sieve. 2.4 m. n-butyl lithium (3.75 ml.) was added to the stirred tetrahydrofuran solution and the polymerization allowed to proceed to a 40% conversion of cyclic siloxane into polymer. The polymerization was terminated by the addition of the chlorosilane prepared according to Example 6 (3.36 g., 0.009 mole) and the polymeric product isolated after precipitation with methyl alcohol. The product had a narrow molecular weight distribution $\overline{M}_n/\overline{M}_w < 1.5$ with the following average formula

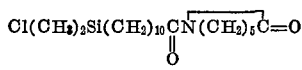

That which is claimed is:

1. A silane of the formula

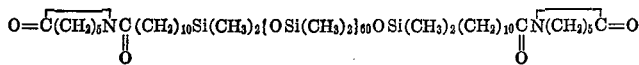

wherein each R" represents a halogen atom or a monovalent substituent containing less than 19 carbon atoms and selected from the group consisting of alkoxy substituents, alkoxyalkoxy substituents, aryloxy substituents, acyloxy substituents, hydrocarbon substituents and halogenated hydrocarbon substituents free of aliphatic unsaturation, R represents alkylene or alkenylene substituents having from 3 to 18 carbon atoms and R' represents alkylene substituents having from 3 to 15 carbon atoms.

2. A silane as claimed in claim 1 wherein each R" individually represents a substituent selected from the groups consisting of chlorine atoms and alkoxy substituents containing less than 5 carbon atoms.

3. A silane as claimed in claim 1 wherein R represents alkylene having from 3 to 11 carbon atoms.

4. A silane as claimed in claim 1 wherein R represents alkoxy of 1 to 4 carbon atoms.

5. The silane

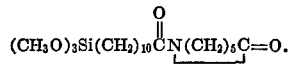

6. A siloxane having at least one unit of the formula

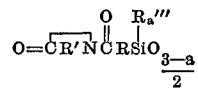

wherein R contains 3 to 18 carbon atoms and represents alkylene or alkenylene and R' represents alkylene having from 3 to 15 carbon atoms, R''' contains 1 to 18 carbon atoms and represents monovalent hydrocarbon or monovalent halogenated hydrocarbon and $a$ is 0, 1 or 2, any other units having the formula

wherein Z represents hydrogen, monovalent hydrocarbon or monovalent halogenated hydrocarbon and $b$ is 0, 1, 2 or 3.

7. A siloxane polymer as claimed in claim 6 wherein R" and Z are methyl, phenyl or a mixture of methyl and phenyl radicals.

8. The disiloxane

wherein R, R' and R''' are as defined in claim 6.

9. The disiloxane of claim 8 wherein R' is —(CH$_2$)$_5$—, R is —(CH$_2$)$_{10}$— and R''' is CH$_3$.

10. A siloxane copolymer comprising units of the formulae specified in claim 9 in which $a$ is 1 or 2 and $b$ is 2.

11. A siloxane copolymer as claimed in claim 10 wherein R" and Z are methyl, phenyl or a mixture thereof.

References Cited

UNITED STATES PATENTS

| | | | |
|---|---|---|---|
| 2,876,234 | 3/1959 | Hurwitz et al. | 260—239.3 R |
| 2,902,468 | 9/1959 | Fianu | 260—46.5 E |
| 3,209,053 | 9/1965 | Gilkey et al. | 260—46.5 E |

HENRY R. JILES, Primary Examiner

R. T. BOND, Assistant Examiner

U.S. Cl. X.R.

106—287 SB; 260—46.5 E, 326.5 A, 293.86, 824 R